3,329,933
SAFETY WARNING MEANS FOR HYDRAULIC BRAKE SYSTEM

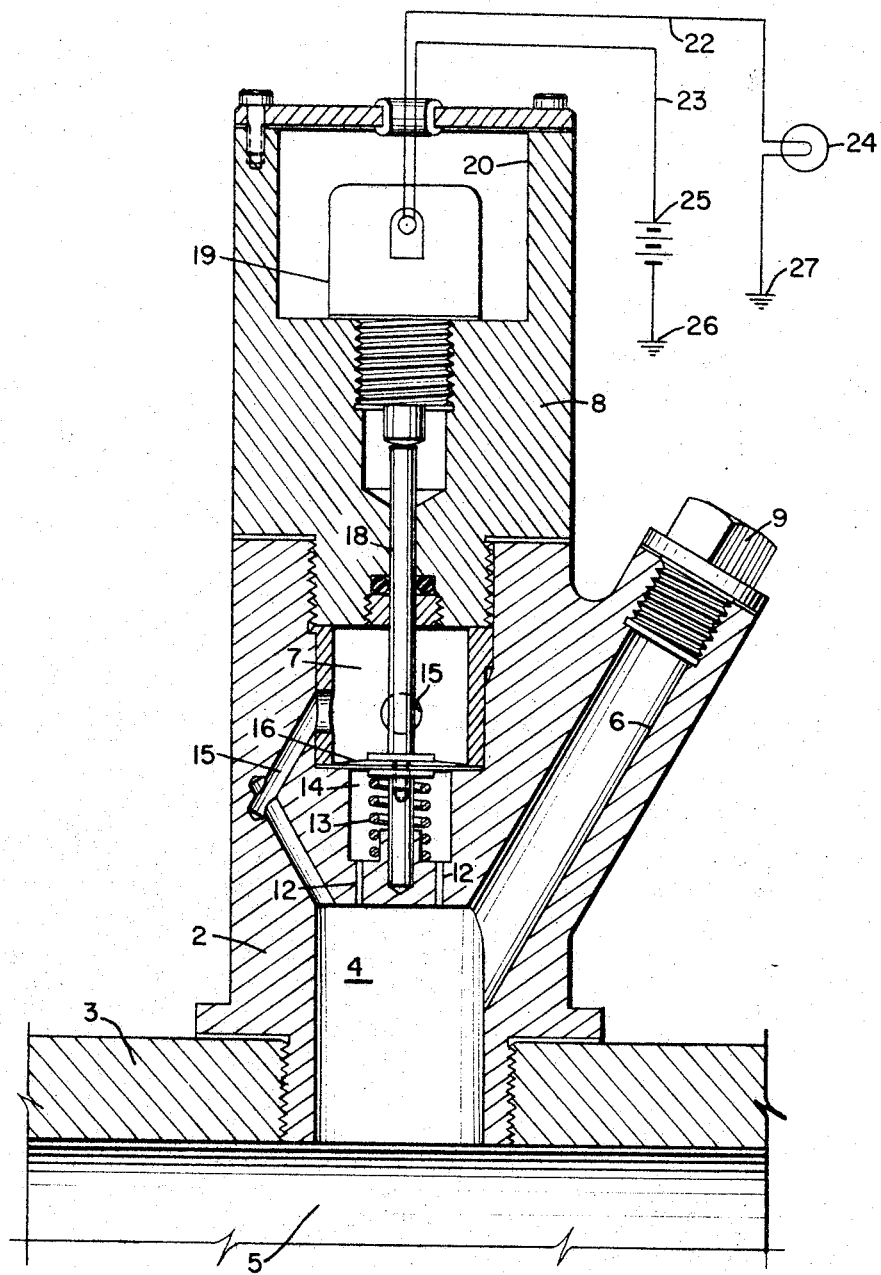

Thomas O. Van Tuyl, 1679 S. Zephyr Court, Denver, Colo. 80226
Filed July 8, 1964, Ser. No. 381,187
4 Claims. (Cl. 340—52)

This invention relates to a hydraulic brake system safety warning signal means, and more particularly it relates to a device which will provide a warning signal on the dashboard of a vehicle which employs a hydraulic brake system, resulting from a low pressure in the system due to evaporation of brake fluid, malfunction of master cylinder or wheel cylinders, or leaks anywhere in the brake system.

An object of the invention is to provide a device which will produce a warning signal on the vehicle dashboard, on a malfunction in the hydraulic brake system of the vehicle.

Another object of the invention is to provide a warning signal system for a hydraulic brake system of a vehicle which is applicable to existing vehicles and is, also, readily incorporated in the design of the master cylinder of new vehicles.

These and other objects and advantages of the invention may be readily ascertained by referring to the following description and appended drawings in which the single figure is a cross-sectional, elevational view of a warning system, according to the invention, installed on the master cylinder of a vehicle hydraulic brake system.

In the drawing, the housing of the warning signal means is mounted on the master cylinder of the hydraulic brake system of the vehicle. Specifically, a housing 2 is threadedly engaged with an opening in the wall 3 of a vehicle master cylinder in such a manner that a recess 4 in the housing communicates with the pressurized hydraulic fluid of the hydraulic system in space 5 thereof. An inlet passage 6 closed by a removable cap 9 provides means for filling the system with hydraulic fluid. The body 2 has its upper end closed by a closure body 8, leaving a chamber 7 in the upper portion of the body 2. The chamber 7 is connected with a smaller chamber 14, that is, smaller in cross-sectional dimensions, but the two are sealed apart by means of a flexible diaphragm 16 mounted in the chamber 7. The recess 4 is in communication with the chamber 7 by means of a plurality of passages 15 which permit fluid to pass to and from the space 4 and the chamber 7. The chamber 14 is in communication with the space 4 by means of small passages 12. An actuating rod 18 extends upwardly from the diaphragm 16 to a microswitch or activating switch 19 mounted in a space 20 in the closure body 8. Upward movement of the diaphragm pushes the rod 18 and actuates the switch 19, as explained below. The passages 15 have a combined cross-sectional area substantially larger than the combined cross-sectional area of the passages 12, and in a preferred form, three passages 15 are provided for the flow of fluid from the recess 4 into the chamber 7, and only two small passages 12 are provided for the flow of fluid to and from chamber 14 into the chamber 4. When seated on the top edge of chamber 14, the area of the diaphragm exposed to hydraulic fluid in chamber 7 is substantially greater than the area of the diaphragm exposed to fluid in chamber 14. Under equilibrium conditions, where the pressure in chamber 7 is equal to the pressure in chamber 14, a greater force is exerted on the top of the diaphragm than on the bottom by virtue of the greater area of exposure, tending to keep the diaphragm seated on top of the chamber 14. A helical spring 13 mounted below the diaphragm 16 tends to bias the diaphragm in an upward position, and tends to distend the diaphragm into chamber 7. Under normal conditions, the greater force in chamber 7 is sufficient to maintain the diaphragm seated on chamber 14 and prevent distension of the diaphragm and thus prevents movement of the rod 18 upwardly to actuate the switch 19. If the hydraulic pressure is reduced so that the force on the top of the diaphragm is reduced below combined force of the hydraulic fluid and the spring tension on the bottom of the diaphragm, the spring forces the diaphragm and the rod upwardly, activating the signal means. Fluid is forced out of chamber 7 through passages 15 by movement of the diaphragm into the chamber 7 to permit full distension of the diaphragm into the chamber.

Under normal conditions a hydraulic brake system is pressurized, and it is further pressurized by activating master cylinder by depressing a brake pedal. When the brake pedal is depressed to pressurize the fluid, by virtue of the larger passages 15, more pressure is exerted into chamber 7 than into chamber 14 through the small passages 12, increasing the pressure on the top side of the diaphragm in chamber 7. The greater pressure in chamber 7 prevents distension of the diaphragm, holds the spring compressed and prevents the rod 18 from being moved upwardly to actuate the switch. Under low pressure conditions, however, the spring biased against the diaphragm distends the diaphragm into the chamber 7, which exposes the full area of the bottom of the diaphragm which then equalizes the forces on top and bottom of the diaphragm, so that the spring pressure is able to move the diaphragm and the rod upwardly to actuate the signal. The larger passages permit exit of fluid from chamber 7 as the diaphragm is distended into the chamber to thereby permit full distension of the diaphragm into the chamber and full movement of the rod to actuate the signal means.

One form of warning signal is illustrated in the drawing, wherein a pair of conductors 22 and 23 from the actuating switch 19 provides a circuit for illuminating a lamp 24 when the switch is actuated. The circuit includes a vehicle battery 25 which is grounded in conventional manner by ground 26, and the lamp is, likewise, grounded in conventional manner by means of a ground 27.

When the master cylinder is pressurized by depressing the brake pedal, if there is a low system pressure, due to low fluid level or leaks anywhere within the brake system, the spring 13 biased against the diaphragm 16 will distend the diaphragm into chamber 7 because of the reduced pressure on the top of the diaphragm, forcing fluid out of the chamber through the passages 15, producing an upward movement of the plunger 18, actuating the switch 19. Actuation of the switch 19 will illuminate the signal light on the dash, warning the driver of a malfunction of the vehicle's brake system.

What is claimed is as follows:
1. In combination with the master hydraulic cylinder of a vehicle hydraulic brake system and a warning signal on the vehicle's dashboard, a safety warning system comprising
 (a) a housing connected with a master cylinder of a hydraulic brake system and having a first recess therein arranged in fluid communication with the fluid system of the master cylinder;
 (b) a second recess in said housing;
 (c) a flexible diaphragm in said second recess, dividing the same into an upper and lower chamber, the upper surface of said diaphragm having an exposed area in said upper chamber which is substantially greater than the exposed area of the lower surface of the diaphragm in said lower chamber in undistended position;

(d) bias means normally tending to distend said diaphragm into said upper chamber;

(e) at least one first passage providing fluid communication between said first recess and said upper chamber and at least one second passage providing fluid communication between said first recess and said lower chamber, the cross-sectional area of said at least one first passage being substantially greater than the cross-sectional area of said at least one second passage;

(f) actuating means mounted on said diaphragm responsive to movement thereof;

(g) and switch means activated by said activating means for operating said warning signal on the dashboard of a vehicle.

2. The combination of claim 1 wherein said at least first passage is three passages and said at least second passage includes two passages.

3. The combination of claim 1 wherein said bias means is a helical spring.

4. The combination of claim 1 wherein said actuating means is a push rod contacting the upper surface of said diaphragm and extending upwardly therefrom.

References Cited

UNITED STATES PATENTS

| | | | |
|---|---|---|---|
| 3,011,595 | 12/1961 | Heiss et al. | 340—52 X |
| 3,148,364 | 9/1964 | Engels et al. | 340—242 |
| 3,173,446 | 3/1965 | Mitchell | 303—84 X |
| 3,212,826 | 9/1965 | Petty | 303—84 |
| 3,251,032 | 5/1966 | Brayton | 340—60 |

NEIL C. READ, *Primary Examiner.*

A. H. WARING, *Assistant Examiner.*